(12) United States Patent
Matsumoto

(10) Patent No.: US 11,196,563 B2
(45) Date of Patent: Dec. 7, 2021

(54) SYSTEM AND METHOD FOR PROVIDING SERVICES VIA A NETWORK

(71) Applicant: CANON KABUSHIKI KAISHA, Tokyo (JP)

(72) Inventor: Kiyonori Matsumoto, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 363 days.

(21) Appl. No.: 16/156,829

(22) Filed: Oct. 10, 2018

(65) Prior Publication Data

US 2019/0116044 A1 Apr. 18, 2019

(30) Foreign Application Priority Data

Oct. 17, 2017 (JP) .................. 2017-201417

(51) Int. Cl.

| H04L 9/32 | (2006.01) |
|---|---|
| H04L 9/30 | (2006.01) |
| H04L 9/08 | (2006.01) |
| H04W 12/06 | (2021.01) |
| H04L 29/06 | (2006.01) |

(52) U.S. Cl.
CPC .......... *H04L 9/3231* (2013.01); *H04L 9/0866* (2013.01); *H04L 9/0894* (2013.01); *H04L 9/0897* (2013.01); *H04L 9/30* (2013.01); *H04L 9/321* (2013.01); *H04L 9/3247* (2013.01); *H04L 63/0861* (2013.01); *H04W 12/06* (2013.01); *H04L 9/0819* (2013.01); *H04L 63/062* (2013.01); *H04L 63/0876* (2013.01); *H04L 2209/80* (2013.01)

(58) Field of Classification Search
CPC ......... H04L 9/32; H04L 9/3231; H04L 9/321; H04L 9/3247; H04L 9/30; H04L 9/08; H04L 9/0897; H04L 9/0866; H04L 9/0894; H04L 9/0877; H04L 63/08; H04L 63/0861; H04L 63/06; H04L 63/0676; H04L 63/061; H04L 63/062; H04W 12/06; H04W 12/04; H04W 12/1008; G06F 21/32

See application file for complete search history.

(56) References Cited

U.S. PATENT DOCUMENTS

| 10,708,065 | B2* | 7/2020 | Lu ...................... H04L 63/0861 |
|---|---|---|---|
| 2007/0106895 | A1 | 5/2007 | Huang |
| 2017/0155629 | A1* | 6/2017 | Gomi ............... H04W 12/0609 |
| 2017/0208464 | A1* | 7/2017 | Guertler ............... H04B 10/112 |
| 2017/0230355 | A1* | 8/2017 | Su ....................... H04L 63/0823 |
| 2018/0026949 | A1* | 1/2018 | Kimn ................... H04L 9/3268 713/156 |

(Continued)

FOREIGN PATENT DOCUMENTS

JP 2016-208494 A 12/2016

*Primary Examiner* — Kristine L Kincaid
*Assistant Examiner* — Shaqueal D Wade
(74) *Attorney, Agent, or Firm* — Canon U.S.A., Inc., IP Division

(57) ABSTRACT

A device is provided that is used by a user that transmits an authentication request including a parameter for verification to a connected mobile terminal in a case where an operation request is generated, receives, from the mobile terminal, a response including signature data generated according to biometric authentication in the mobile terminal, and executes the operation request in a case where verification of the signature data using a public key received from a service provision system is successful.

15 Claims, 9 Drawing Sheets

(56) References Cited

U.S. PATENT DOCUMENTS

2018/0054435 A1\* 2/2018 Sakamoto ............. H04L 9/3231
2018/0343127 A1\* 11/2018 Campagna ............ H04L 9/0825
2019/0081802 A1\* 3/2019 Ying .................... H04L 9/3268

\* cited by examiner

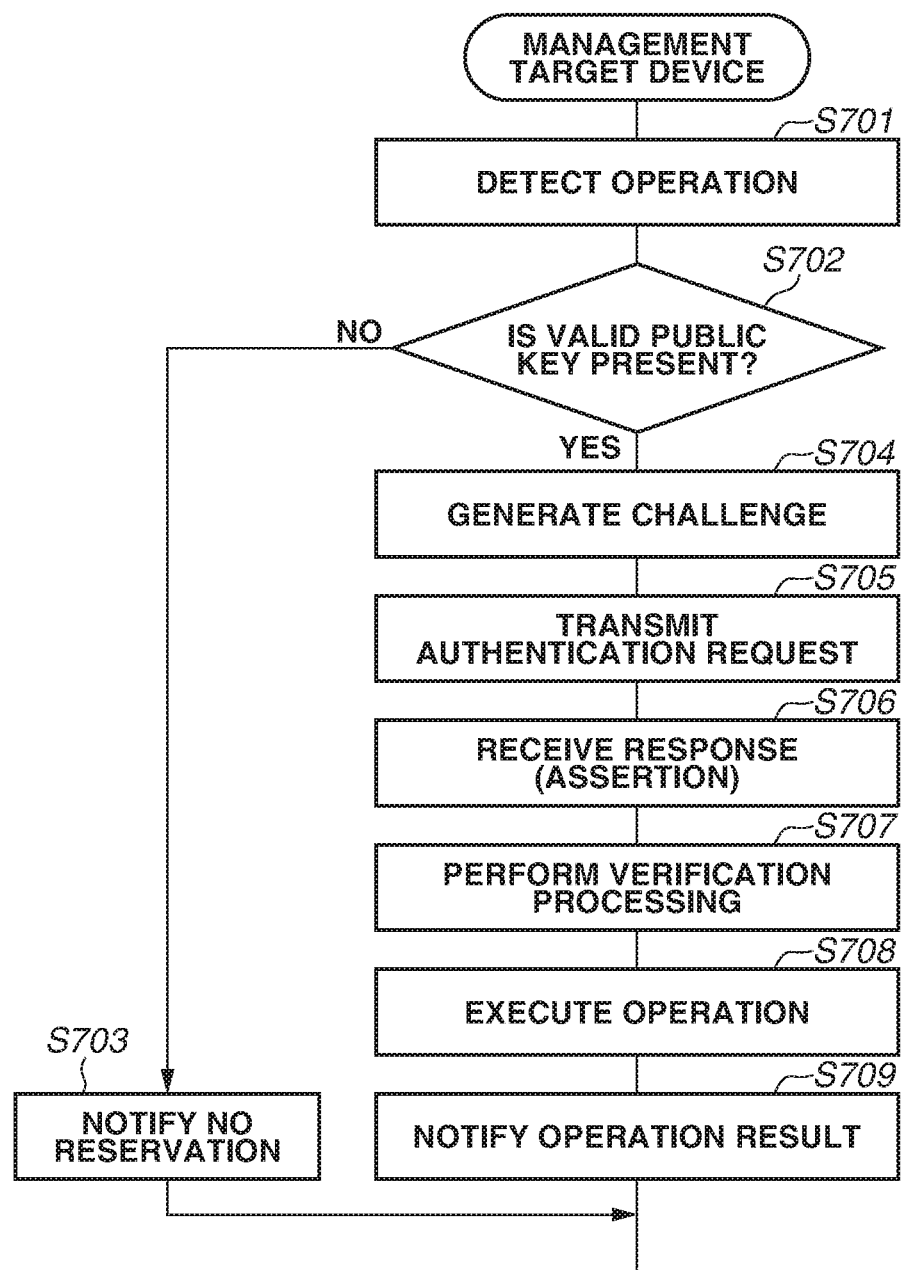

SYSTEM AND METHOD FOR PROVIDING SERVICES VIA A NETWORK

BACKGROUND

Field of the Invention

The present invention relates to an authentication technique for providing services via a network.

Description of the Related Art

Some mobile devices (e.g., vehicle, drone, and robot) have been recently used to provide services to multiple users.

For example, a car sharing service of a vehicle as a mobile device is known. The car sharing service is a service in which only a contracted customer who has made a reservation during a period corresponding to the reservation made by the customer can unlock a vehicle and use the vehicle according to the reservation made by the customer.

In addition, a home delivery service and the like by a drone as a mobile device to be used by multiple users is known. In this service, it is assumed that articles are delivered when a user who uses the home delivery service is identified. A robot can also be used selectively by multiple users in guidance services, administrative services, and the like.

In this regard, Japanese Patent Application Laid-Open No. 2016-208494 discusses a technique in which a public key generated in a terminal owned by a user is stored in an external server so as to unlock a vehicle. Japanese Patent Application Laid-Open No. 2016-208194 also discusses a technique in which when the user sends an unlock instruction to the vehicle, the vehicle requests the external server to verify the instruction transmitted from the user, and it is determined whether vehicle should be unlocked based on the verification result.

For example, in the case of a vehicle, the position of the vehicle itself is movable, and thus there is a possibility that the vehicle cannot be unlocked due to a failure in communication with the external server discussed in Japanese Patent Application Laid-Open No. 2016-20849, for example, when the vehicle is moved to a location that is outside of a connectable range of a mobile telephone network. Also, for example, when the external server is stopped, the vehicle cannot be unlocked, which causes a significant deterioration in usability. Not only a vehicle, but also a system in which services are provided after the individual users or the like are identified for mobile devices have the same problems as those described above.

SUMMARY

According to an embodiment, a system includes a mobile terminal including a storage area having a tamper resistance and configured to store user biological information required for performing authentication processing, and a biological information sensor configured to read the user biological information, a service provision system configured to provide a user with a service for using a device, and a device managed by the service provision system, wherein the mobile terminal comprises a first memory storing instructions and a first processor executing the instructions stored in the first memory causing the mobile terminal to generate a pair of a secret key and a public key corresponding to the user biological information read by the biological information sensor, store, in the storage area in an associated manner, the user biological information read by the biological information sensor, identification information for identifying authentication using the biological information, and the generated secret key, and transmit the identification information and the public key paired with the generated secret key to the service provision system so that the identification information and the public key are registered in the service provision system, wherein the service provision system comprises a second memory storing instructions and a second processor executing the instructions stored in the second memory causing the service provision system to manage, in an associated manner, the identification information received from the mobile terminal, the public key, user information about a user of the mobile terminal, and device information about a device to be used by the user, and transmit the public key managed in association with the device information, to the device indicated by the managed device information, wherein the device comprises a third memory storing instructions and a third processor executing the instructions stored in the third memory causing the device to store the public key received from the service provision system, generate a parameter for verification in a case where an operation request for the device is generated, and transmit an authentication request including the generated parameter to the connected mobile terminal, wherein the instructions stored in the first memory further cause the mobile terminal to execute, in a case where the authentication request is received, biometric authentication using the user biological information read by the biological information sensor and the biological information stored in the storage area, generate, in a case where the biometric authentication is successful, signature data using the secret key stored in the storage area in association with the biological information used for the biometric authentication, and the parameter included in the received authentication request, and transmit a response including the generated signature data to the device, and wherein the instructions stored in the third memory further cause the device to execute verification of the signature data included in the response by using the stored public key and the parameter included in the authentication request, and execute the operation request for the device in a case where the verification is successful.

Further features will become apparent from the following description of exemplary embodiments with reference to the attached drawings.

BRIEF DESCRIPTION OF THE DRAWINGS

FIG. 7 is a flowchart illustrating device utilization start processing according to a second exemplary embodiment.

DESCRIPTION OF THE EMBODIMENTS

Exemplary embodiments will be described below with reference to the drawings.

In recent years, Fast Identity Online (FIDO) has been attracting attention as a new authentication system including biometric authentication. Unlike a password used for ID/password authentication, biological information, such as a fingerprint or a vein, which is used for biometric authentication, cannot be rewritten if the information leaks to outsiders. For this reason, a leakage of biological information is a fatal mistake. On the other hand, on the FIDO, an authentication operation is performed on a user terminal, instead of performing the authentication operation on a server via the Internet, so that a leakage of biological information via a network can be prevented. Accordingly, it can be said that the FIDO has a low risk of information leakage.

In exemplary embodiments, a case is assumed where an authentication technique corresponding to the FIDO is applied in a case where a network connection state or the like changes and pre-processing for providing individual users with services is performed on a mobile device (e.g., vehicle, drone, robot) to provide services to multiple users. For example, an authentication system that performs unlock processing when a car sharing service for a vehicle is carried out. In addition, the authentication system can also be applied in a case where home delivery products are delivered to customers when a home delivery service is carried out by a drone or the like.

In the following exemplary embodiment, a case where the authentication system is applied particularly to a vehicle will be described in detail.

Figure 1:
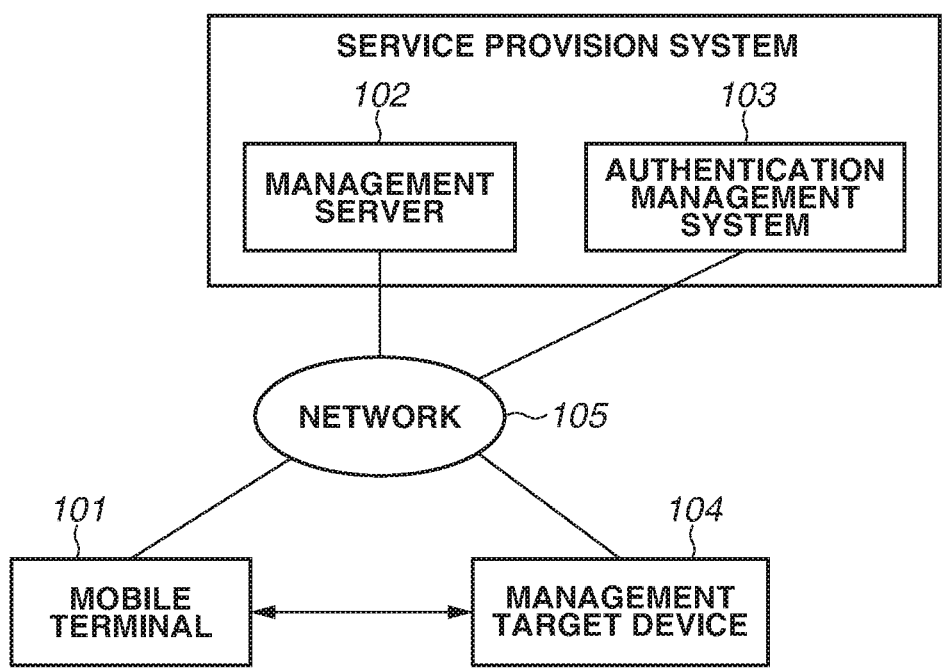
FIG. 1 is a block diagram illustrating an overall configuration example of a system according to a first exemplary embodiment.

FIG. 1 is a block diagram illustrating an overall configuration example of a system according to a first exemplary embodiment.

This system includes a mobile terminal 101, a management server 102, an authentication management system 103, a management target device 104, and a network 105. The mobile terminal 101, the management server 102, the authentication management system 103, and the management target device 104 are each connected to the network 105 so as to communicate with each other.

In the present exemplary embodiment, the management server 102 and the authentication management system 103 operate in cooperation with each other, thereby implementing the provision of services that enable a user of the mobile terminal 101 to use the management target device 104. Accordingly, the system including the management server 102 and the authentication management system 103 is referred to as a service provision system. For example, the service provision system is located on the Internet.

The network 105 is a communication network which is, for example, any one of a local area network, a wide area network (WAN), a telephone line, a dedicated digital line, an asynchronous transfer mode (ATM) or frame relay line, a cable television line, and a data broadcasting wireless line, or a combination thereof. Further, the mobile terminal 101 and the management target device 104 are configured to be able to communicate with each other by short distance wireless communication as typified by, for example, Bluetooth® or NFC.

The management target device 104 is a mobile device that can be used by multiple users as described above. In the present exemplary embodiment, in particular, a vehicle is described as the mobile device.

Figure 2A:
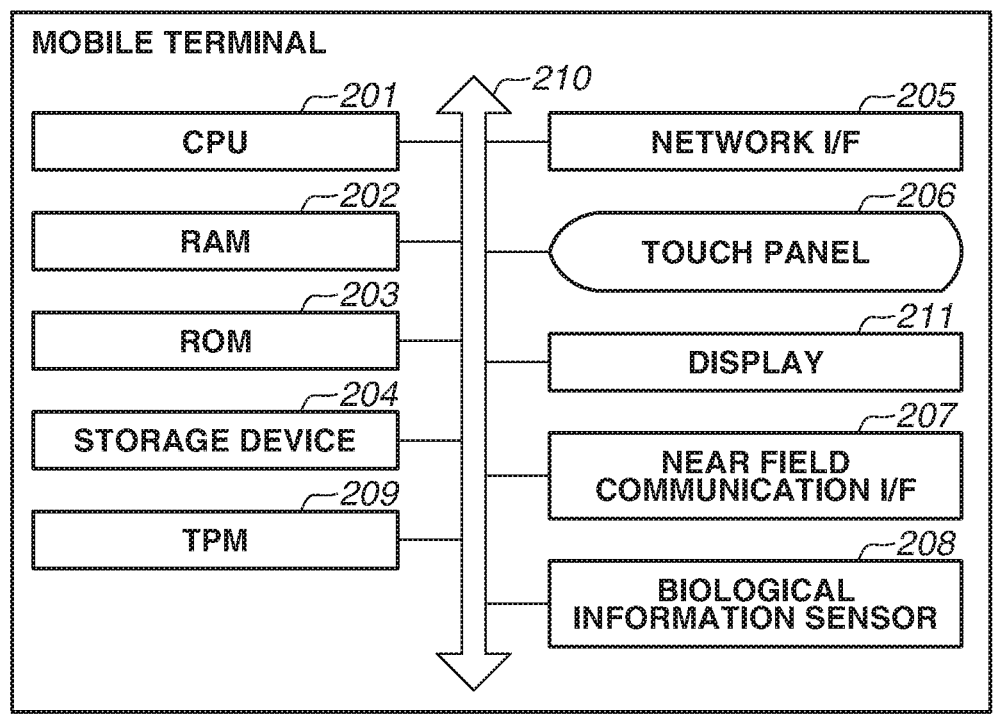
FIGS. 2A, 2B, and 2C are block diagrams each illustrating a hardware configuration example of a device according to the first exemplary embodiment.
Figure 2B:
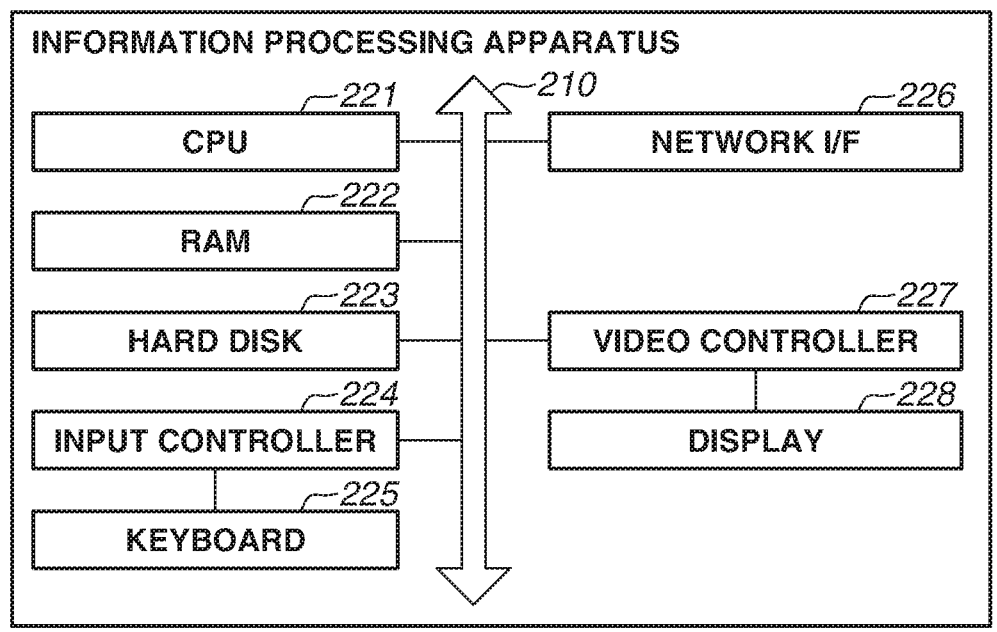
Figure 2C:
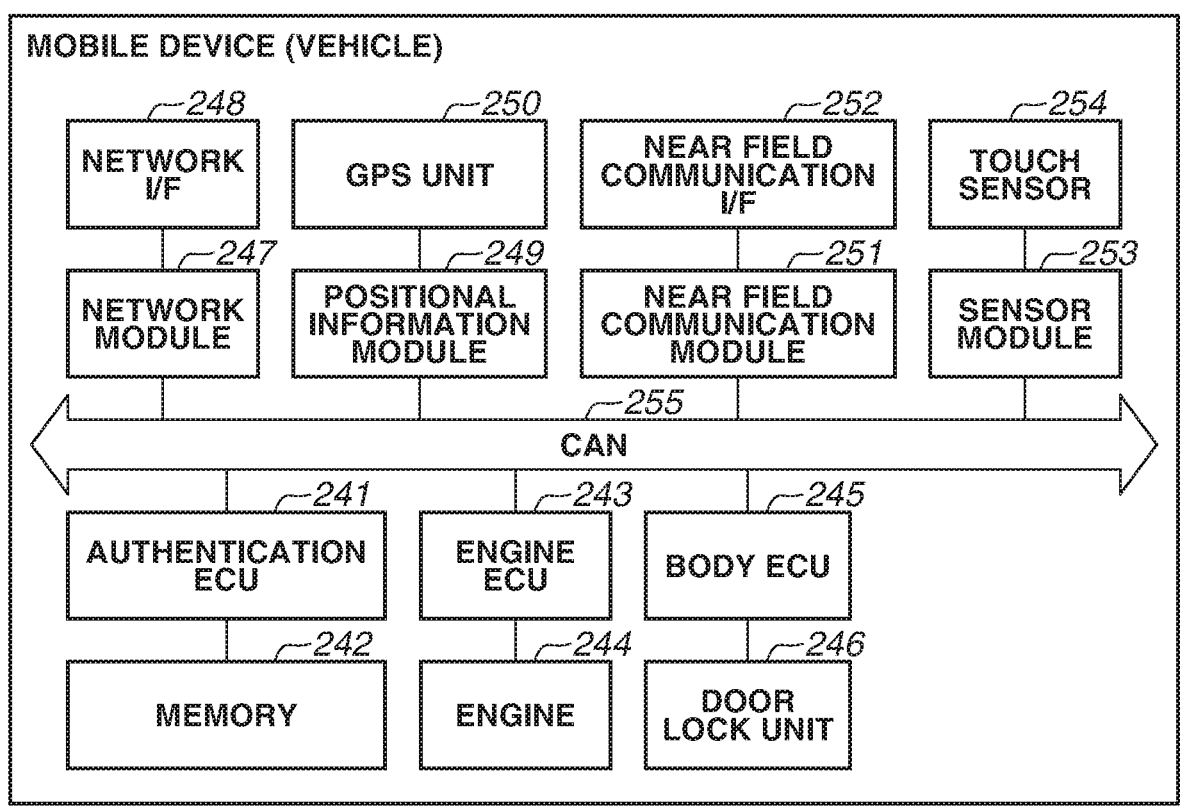

FIGS. 2A, 2B, and 2C are block diagrams each illustrating a hardware configuration example of a device according to the present exemplary embodiment.

FIG. 2A is a hardware configuration diagram illustrating the mobile terminal 101.

A central processing unit (CPU) 201 executes programs stored in a read only memory (ROM) 203, an operating system (OS) and various applications loaded into a random access memory (RAM) 202 from a storage device 204, programs for implementing sequences to be described below according to the present exemplary embodiment. Thus, the CPU 201 functions as each processing unit that executes processing in each flowchart to be described below, by executing programs stored in a computer-readable storage medium. The RAM 202 is a main memory for the CPU 201 and functions as a work area and the like. A touch panel 206 is an input device of the mobile terminal 101. The CPU 201 detects an operation on the touch panel 206 and controls programs. A display 211 is one of output devices of the mobile terminal 101. The CPU 201 displays results of various operations and the like on the display 211, thereby notifying the user of the results. A network interface (I/F) 205 is connected to the network 105 to communicate with a device connected to the network. A near field communication I/F 207 is an I/F used to perform input/output operations through near field communication such as Bluetooth®, and communicates with a connected device. A Trusted Platform Module (TPM) 209 is a security chip which has a tamper resistance and functions independently of an OS and other hardware, and serves as a storage area for processing and storing confidential information. In the present exemplary embodiment, the TPM 209 stores user biological information (or feature amount of the biological information) used for biometric authentication, a secret key required for authentication processing to be described below, and the like. In the present exemplary embodiment, the TPM 209 can also be implemented in such a manner that a secure memory space which operates separately from other spaces on one chip is ensured to achieve the tamper resistance, and a storage area for managing user biological information (or feature amount of the biological information), a secret key, and the like in the memory space is provided. A biological information sensor 208 is a sensor for reading user biological information. For example, the biological information sensor 208 reads information about a fingerprint, iris, or vein of the user and converts the information into a signal. Biological information used for biometric authentication, or the feature amount of the biological information is hereinafter referred to as biological information. Constituent elements of the mobile terminal 101 are connected to an internal bus 210 so as to communicate with each other.

In the present exemplary embodiment, a case is assumed where the mobile terminal 101 is a smartphone, a mobile phone, or the like owned by the user. Alternatively, a tablet or laptop personal computer (PC), a wearable terminal, and the like may be used as the mobile terminal 101 as long as the mobile terminal 101 has an environment in which programs for implementing the TPM 209, the biological information sensor 208, and processing to be described below can be executed.

FIG. 2B is a hardware configuration diagram illustrating an information processing apparatus which constitutes the management server 102 and the authentication management system 103.

A CPU 221 executes an OS and applications loaded into a RAM 222 from a hard disk 223, and programs for implementing sequences to be described below according to the present exemplary embodiment. The RAM 222 is a main memory for the CPU 221 and functions as a work area or the like. An input controller 224 controls an operation input from a keyboard 225 or a pointing device e.g., mouse, touch pad, and trackball) which is not illustrated. A video controller 227 controls a display output for a display 228 and the like. A network I/F 226 is connected to the network 105 and executes communication control processing with other devices connected to the network 105. As the storage device for the management server 102 and the authentication management system 103, a storage service on the network 105 can also be used in addition to the hard disk 223.

FIG. 2C is a hardware configuration diagram illustrating the management target device 104. FIG. 2C illustrates only the main components including components related to the present exemplary embodiment in the vehicle.

An engine electronic control unit (ECU) 243 manages an engine 244 and controls starting and stopping of the engine 224, the rotational speed of the engine 244, and the like. A body ECU 245 manages, for example, a door lock unit 246, and controls unlocking and locking of the door lock unit 246. An authentication ECU 241 includes a memory 242 and has a function of transferring an operation request to each ECU after performing verification of the validity of the requested operation via a near field communication module 251 and a network module 247. The engine ECU 243, the body ECU 245, and the authentication ECU 241 each include a ROM (not illustrated), read a program stored in the ROM and execute the program, thereby controlling each unit and performing communication control and the like with an in-vehicle network as typified by a Car Area Network (CAN) 255. The network module 247 controls a network I/F 248. The network 248 is connected to the network 105 and executes communication control processing with other devices connected to the network 105. A positional information module 249 is connected to, for example, a global positioning system (GPS) unit 250, and provides information about a current vehicle position according to a request. The near field communication module 251 controls a near field communication I/F 252. The near field communication I/F 252 is an I/F used to perform transmission and reception through near field communication as typified by Bluetooth® and NFC. In the present exemplary embodiment, the near field communication I/F 252 is used to check whether the management target device 104 and the mobile terminal 101 are located in proximity to each other and to establish intercommunication between the mobile terminal 101 and the management target device 104.

A sensor module 253 controls the connected sensor and reads values according to a request from each ECU. Further, the sensor module 253 detects a change in the output from the connected sensor, and notifies various ECUs of the detected change in an event form. A touch sensor 254 is a sensor for sensing a contact of a human body. In the present exemplary embodiment, a touch sensor is disposed on the back side of a door knob and the touch sensor is used to detect an event in which the user touches the door knob.

Figure 3:
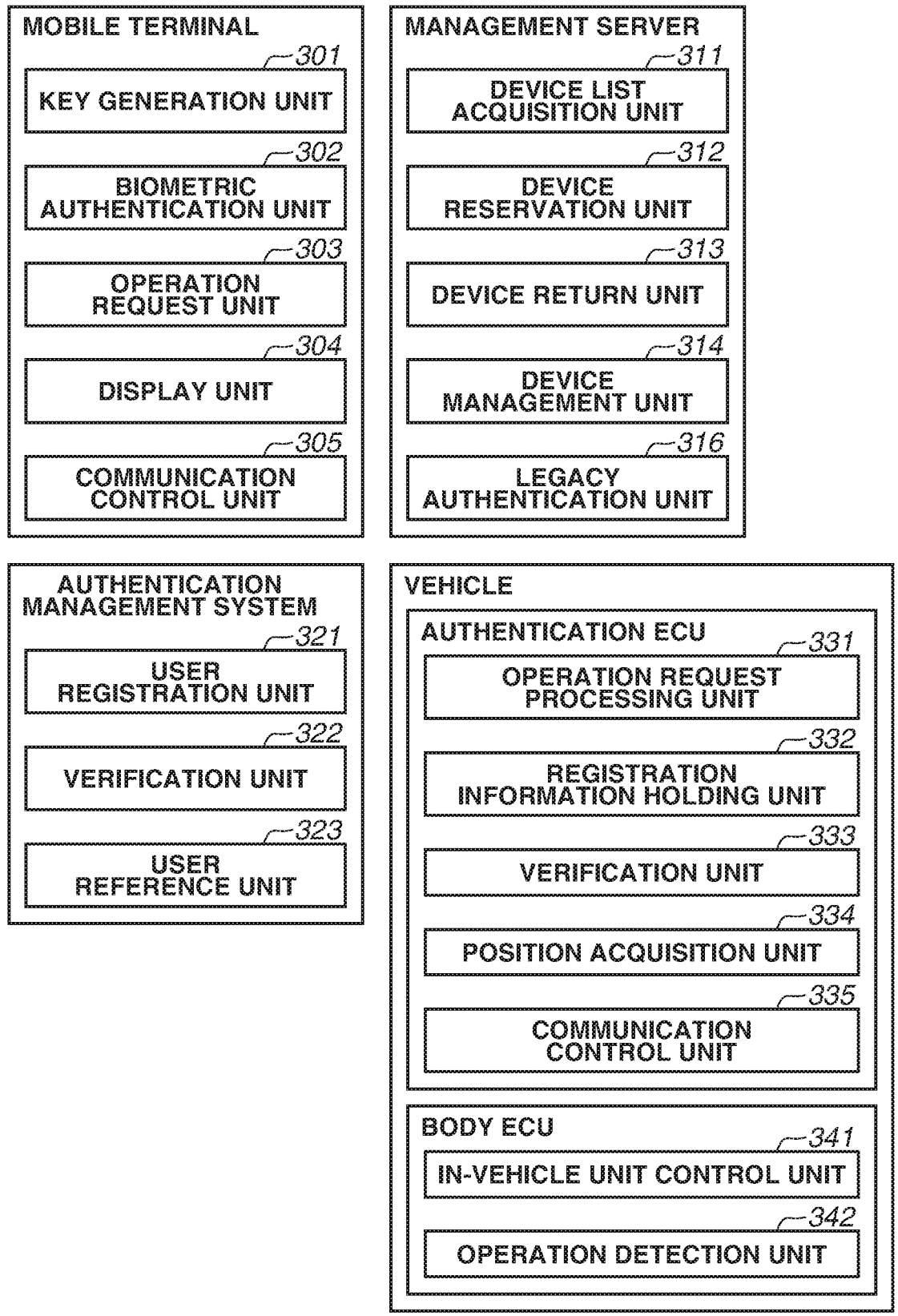
FIG. 3 is a block diagram illustrating a configuration example of software modules of each device according to the first exemplary embodiment.

FIG. 3 is a block diagram illustrating a configuration example of software modules of each device according to the first exemplary embodiment. In the present exemplary embodiment, functional modules (illustrated blocks) are each illustrated as a subject for processing to be implemented by a program executed by a CPU or ECU of each device. For example, in the vehicle according to the present exemplary embodiment, processing to be performed by each ECU is illustrated separately.

Each module included in the mobile terminal 101 will now be described.

A key generation unit 301 generates a pair of a public key and a secret key associated with biological information used for authentication processing. A biometric authentication unit 302 controls storage of user biological information read by the biological information sensor 208 into the TPM 209, biometric authentication using the stored biological information, and the like. Table A shows an example of data stored in the TPM 209 of the mobile terminal 101.

TABLE A

| RPID | Authentication Information ID | Secret Key | Public Key | Biological Information ID |
| --- | --- | --- | --- | --- |
| example.com | 1adx5e41zdd2x | 4acab6e7 | d3e39967 | d493a744 |
| example.net | 8e1z9fmb8ehen | 89abcdef | 124578ab | dcc97daa |

In Table A, an authentication information ID for identifying biological information and a pair of a secret key and a public key are managed in association with each other for each identification information (RPID) corresponding to a service used through biological authentication by the mobile terminal 101. The authentication information ID is identification information allocated to each set of RPID, a secret key, and a biological information ID. As the RPID, an ID for identifying a service required for authentication is set. This ID indicates information about a top-level domain and a second-level domain of the service. For example, in a case of a shopping service URL of "http://www.shopping.com", the service M is "shopping.com". The biological information ID is unique identification information allocated to biological information stored in the TPM 209 in a one-to-one correspondence.

An operation request unit 303 controls the execution of various requests from the mobile terminal 101, the transmission and reception of requests via the network I/F 205, and the like. A display unit 304 displays information based on a request, such as a reservation status of the management target device 101, on the display 211. The display unit 304 is a module implemented by a web browser or the like. A communication control unit 305 controls an external connection through the near field communication I/F 207 or the like.

Each module included in the management server 102 will now be described.

A device list acquisition unit 311 treats information including a list of devices that can be used (reserved) by the user. A device reservation unit 312 updates a use (reservation) status of each device. A device return unit 313 updates the use status of each device, such as a reserved status, used status, and a returned status (end state). A device management unit 314 manages device information about each device to be managed, and the use status of each device. A legacy authentication unit 316 performs authentication and log-in processing using user information (user ID) and a password which are input by the user.

Each module included in the authentication management system 103 will now be described.

A user registration unit 321 stores and manages registration information for each user to be authenticated. Table B shows an example of data to be managed in this case. For example, an authentication information ID and a public key are registered as data registered by the user (user ID: User 002) of the mobile terminal 101. As described above with reference to Table A, it can be recognized that the public key corresponding to the secret key stored in the TPM 209 of the mobile terminal 101 in association with the authentication information ID "1adx5e41zdd2x" is managed.

TABLE B

| User ID | Authentication Information ID | Public Key |
|---------|-------------------------------|------------|
| User002 | 1adx5e41zdd2x                 | d3e39967   |
| User003 | dx5e1z9fmb8eh                 | 578d3e3    |

A verification unit 322 verifies signature data generated by a device (e.g., a mobile terminal) located on the network 105 by using the corresponding public key. A user reference unit 323 refers to registration information for each of the managed users, and provides the registration information to outsiders.

Each module included in the management target device (vehicle) 104 will now be described.

An operation request processing unit 331 receives various requests and processes the requests. A registration information holding unit 332 stores and manages information, such as a public key for a user (a person who has made a reservation), which is provided from the authentication management system 103, in the management target device 104. A verification unit 333 verifies signature data in place of the verification unit 322 of the authentication management system 103. A position acquisition unit 334 acquires a current position of the management target device 104 from the positional information module 249. A communication control unit 335 controls an external connection using the near field communication I/F 252 or the like. An in-vehicle unit control unit 341 controls the door lock unit 246 and the like and performs unlock processing and the like. An operation detection unit 342 detects an input through the touch sensor 254.

Functions in the present exemplary embodiment are roughly divided into four functions, i.e., "biological information registration processing input from the mobile terminal 101", "vehicle reservation processing input from the mobile terminal 101", "vehicle control processing input from the mobile terminal 101", and "vehicle return processing input from the mobile terminal 101". These functions will be described with reference each processing unit illustrated in FIG. 3.

First, "registration processing based on biological information input from the mobile terminal 101" will be described.

The user operates the mobile terminal 101 to connect to a website provided by a web server (not illustrated) included in the management server 102. It is based on the premise that a web browser for implementing the display unit 304 is running on the mobile terminal 101. When the user inputs a user ID and a password to the website displayed on the display unit 304, the input information is delivered to the legacy authentication unit 316 and user log-in processing is carried out. In this case, the user ID is a character string which is acquired as a result of authentication by the legacy authentication unit 316 and has a unique value for each user. The input user ID is stored in the storage medium 204 so that the user ID is used for processing to be described below.

Next, the user sends a credential registration instruction through the website on the management server 102. In response to this instruction, the management server 102 requests the authentication management system 103 to register a credential. The user registration unit 321 of the authentication management system 103 transmits a credential creation request including "Request Provider (RP) ID" and "attestationChallenge" to the mobile terminal 101 in response to the request. The RPID is an ID unique to a provider that provides services. In general, a fully qualified domain name (FQDN) of a provider that provides services is used. Further, "attestationChallenge" is a random byte sequence presented by the authentication management system 103.

In the mobile terminal 101, in response to a reception of the credential creation request, the biometric authentication unit 302 displays, on the display 211, a screen for requesting an agreement of registration of a credential based on biological information. In a case of agreement, the user presents biological information (e.g., fingerprint) to the biological information sensor 208. Further, the key generation unit 301 generates a pair of a secret key and a public key. The biometric authentication unit 302 stores, in the TPM 209, the RPID included in the credential creation request, the generated secret key, the biological information read by the biological information sensor 208, the biological information ID of the biological information, the authentication information ID allocated to the combination thereof, and the like. Then, the biometric authentication unit 302 creates a credential including data (attestation) obtained by encrypting "attestationChallenge" using a secret key, the public key corresponding to the secret key, the authentication information ID, and an algorism used to create the pair of the secret key and the public key. The credential created in this case is transmitted to the authentication management system 103 through the network I/F 205 by the operation request unit 303.

The verification unit 322 of the authentication management system 103 decodes an attestation included in a credential by using a public key included in the credential. Further, the verification unit 322 executes verification processing based on whether the attestation matches the "attestationChallenge" included in the credential creation request. When the attestation matches the "attestationChallenge", the user registration unit 321 stores, in a storage device, information such as the user ID used for log-in authentication by the legacy authentication unit 316 described above, the authentication information ID included in the credential, and the public key in association with each other.

Next, reservation processing for the device (vehicle) 104 input from the mobile terminal 101 will be described.

The user operates the mobile terminal 101 to connect to a website provided by a web server (not illustrated) included in the management server 102. This website is a website for making a vehicle reservation, checking a reservation status, and the like, and is displayed on the display 211 by the display unit 304.

When the user inputs conditions such as a vehicle type and then sends, from this website, an instruction for displaying a list of vehicles that can be reserved by the user, the device list acquisition unit 311 of the management server 102 requests the device management unit 314 to search for devices that match the conditions. The device management unit 314 acquires a list of vehicles that match the conditions and can be reserved by the user. The device list acquisition unit 311 reflects the acquired list on the website described above.

The user selects a vehicle for which the user wishes to make a reservation from the list of vehicles on the website whose display is updated. In response to the selection, the operation request unit 303 transmits information about the vehicle to be reserved to the management server 102.

The device reservation unit 312 of the management server 102 provides the mobile terminal 101 with an authentication screen before making a reservation for the selected vehicle. When the user selects biometric authentication on this screen, an authentication request is sent to the authentication management system 103. The authentication management system 103 transmits biometric authentication parameters including "assertionChallenge" and "transaction" to the mobile terminal 101. The parameter "assertionChallenge" is a parameter for verification generated by the verification unit 322 of the authentication management system 103 and used for challenge-response authentication. The parameter "transaction" described herein refers to a character string encoded by Base64 to present, to the user, information indicating which operation requested.

In response to a reception of biometric authentication parameters, the biometric authentication unit 302 of the mobile terminal 101 displays, on the display 211, a screen for prompting the user to present biological information for biometric authentication. The biometric authentication unit 302 executes biometric authentication processing using the biological information read by the biological information sensor 208 and the biological information stored in the TPM 209. When the authentication is successful, the secret key corresponding to the biological information ID of the biological information used for authentication is retrieved from the TPM 209, and the parameters "assertionChallenge" and "transaction", which are included in the biometric authentication parameters, are encrypted to thereby create signature data. Only the parameter "assertionChallenge" may be encrypted. The biometric authentication unit 302 generates, as a response, "assertion" including the created signature data and the authentication information ID corresponding to the biological information ID of the biological information used for authentication. The created "assertion" is transmitted to the authentication management system 103.

The verification unit 322 of the authentication management system 103 extracts the public key corresponding to the authentication information ID of the returned response, and verifies the signature data included in the response. More specifically, the data obtained from the public key and signature data is compared with "assertionChallenge" and "transaction" included in the biometric authentication parameters, thereby performing the verification. When the verification is successful, it is determined that the authentication for the user corresponding to the user ID registered in association with the authentication information ID is successful. The verification unit 322 notifies the device reservation unit 312 that the authentication is successful.

Lastly, after the determination that the authentication is successful, the device reservation unit 312 makes a request to perform reservation processing of the vehicle selected by the user. In response to this request, the device management unit 314 registers user information (e.g., user ID), device information (e.g., device ID), and information about year, month, date, and time from the start to the end of the reservation, which are included in the conditions input by the user, and issues a reservation ID associated with the reservation information, and manages the reservation based on the reservation ID. The device management unit 314 delivers the reservation ID to the device reservation unit 312. In this case, when information about passengers is included in the conditions input by the user through the website, the device management unit 314 also registers this information and manages the reservation based also thereon. The device reservation unit 312 causes the display unit 304 to display, on the display 211, the completion of reservation and the reservation ID through the website.

Table C shows data stored in a database by the device management unit 314 after completing the reservation processing.

TABLE C

| Reservation ID | User ID | Vehicle ID | Reservation Start Date and Time | Reservation End Date and Time | Passenger User ID |
|---|---|---|---|---|---|
| Rsv001 | User001 | Car002 | 2017/08/28 18:00 | 2017/08/29 18:00 | |
| Rsv002 | User002 | Car005 | 2017/08/28 19:00 | 2017/08/28 23:00 | User008, User010 |
| . | . | . | . | . | . |
| . | . | . | . | . | . |

Next, processing of performing a procedure for using the vehicle (management target device 104) reserved through the mobile terminal 101 will be described in detail with reference to a processing sequence illustrated in FIG. 4. In this example, unlock processing is herein described as an example. However, this procedure can also be applied, for example, in a case where one of the functions in the device 104, such as engine start processing, is used. A vehicle operation application is installed in the mobile terminal 101. The user inputs an operation through an operation screen (UI) provided by the application. Assume that a profile, such as the user ID of the user used for reservation processing described above, is registered in the vehicle operation application. This processing is started when the vehicle operation application is activated on the mobile terminal 101. Further, the vehicle operation application operates in cooperation with the communication control unit 305, the biometric authentication unit 303, and the like in the mobile terminal 101.

In step S401, the communication control unit 305 of the mobile terminal 101 transmits a connection request to the communication control unit 335 of the management target device 104. In step S402, the communication control unit 335 establishes a near field communication with the communication control unit 305 of the mobile terminal 101 in response to the request. The mobile terminal 101 operates the management target device 104 by using a communication path established by this procedure. A plurality of mobile terminals can be connected to one vehicle. Accordingly, as the near field communication used herein, for example, a protocol having a star work configuration using a vehicle as a master, such as Bluetooth®, is preferably used. However, the operation described in the present exemplary embodiment can also be carried out by protocols having other network configurations.

In response to a detection of an input of an unlock operation on the management target device 104 by the user in step S403, in step S404, the operation request unit 303 transmits an operation request to the management target device 104. This request includes the user ID of the user who has issued the request, in addition to the requested operation content (unlock operation).

In step S450, the operation request processing unit 331 of the management target device 104 determines whether a communication with at least one of the management server 102 and the authentication management system 103 can be established. This determination may be made by conducting a dedicated communication test, or may be made based on whether a request for checking a reservation, or a request for acquisition of information for verification is successful as described below. If it is possible to establish the communication (YES in step S450), the processing proceeds to step S405. If it is impossible to establish the communication (NO in step S450), the processing proceeds to step S410.

In step S405, the operation request processing unit 331 transmits a reservation check request to the management server 102. This request includes the user ID and the ID (vehicle ID) of the management target device 104. When a reservation ID is input by the user, the request may include the reservation ID. In step S406, the device management unit 314 of the management server 102 refers to Table C, which is described above, and specifies the reservation information based on the reservation ID, the user ID, and the vehicle ID. In step S406, the device management unit 314 sends the specified reservation information to the management target device 104 as a response.

In step S407, the operation request processing unit 331 requests the authentication management system 103 to send the user ID included in the acquired reservation information and information for verifying the biometric authentication for the user corresponding to the user ID of the passenger. In step S408, the user reference unit 323 of the authentication management system 103 specifies, from Table B, the user ID and information stored in association with the user ID of the passenger, and sends a response to the management target device 104. The specified information includes an authentication information ID and a public key.

The request for acquiring information for verification in step S407 may be transmitted to the management server 102. In this case, the management server 102 sends an inquiry about information for verification to the authentication management system 103 and acquires the information, so that the management server 102 sends the information for verification to the management target device 104 as a response.

In step S409, the user registration information holding unit 332 stores, in the memory 242, the reservation information and the information for verification. Table D shows a part of the stored information. Although not illustrated, other information such as the authentication information ID is also managed in association with the user ID and other data in Table D.

TABLE D (Vehicle ID = Car005)

| User ID | Public Key | Reservation Start Date and Time | Reservation End Date and Time |
|---------|------------|----------------------------------|--------------------------------|
| User002 | d3e39967 | 2017/08/28 19:00 | 2017/08/28 23:00 |
| User008 | aaaaaaaf | 2017/08/28 19:00 | 2017/08/28 23:00 |
| Use010 | bbbbbbbf | 2017/08/28 19:00 | 2017/08/28 23:00 |
| . | . | . | . |
| . | . | . | . |
| . | . | . | . |

In the present exemplary embodiment, an expiration date for information managed in Table D is determined based on a reservation start date and time and a reservation end date and time. Records which have passed the reservation end date and time in Table D are deleted by the user registration information holding unit 332 periodically or when the table is referenced.

In step S410, the operation request processing unit 331 refers to Table D and determines whether information necessary for verification, such as the public key associated with the user ID transmitted from the mobile terminal 101, is stored in the registration information holding unit 332, and further determines whether the expiration date for the information has not expired. Even when the public key is registered, it is determined that no valid public key is present for the operation instruction to the management target device 104 before the reservation start date and time or after the lapse of the reservation end date and time. If a valid public key or the like is already stored (YES in step S410), the processing proceeds to step S411. On the other hand, if a valid public key is not present (NO in step S410), a notification indicating "no reservation" is sent to the mobile terminal 101 and the processing in this sequence is terminated.

The determination processing of step S410 may also be executed before the determination processing of step S450, or when the determination result of the determination processing in step S450 indicates "YES". If the presence of a valid public key can be confirmed in the determination in any one of the steps, the processing from the determination to step S409 may be omitted.

In step S411, the verification unit 333 of the management target device 104 generates "assertionChallenge" and "transaction". In step S412, the verification unit 333 transmits an authentication request including "assertionChallenge" and "transaction" to the mobile terminal 101. The authentication request also includes RPID. The "assertionChallenge" and "transaction" generated in this case are equivalent to those generated by the verification unit 322 of the authentication management system 103 described above. The RPID is an ID that is identical to the ID used when the mobile terminal 101 registers a public key in the authentication management system 103. The RPID may be managed in advance in the management target device 104, or may be acquired at the timing of step S406, S408.

In step S413, in response to a reception of the authentication request, the biometric authentication unit 302 of the mobile terminal 101 displays, on the display 211, a screen for prompting the user to present biological information for biometric authentication. In step S414, the biometric authentication unit 302 executes biometric authentication processing using the biological information read by the biological information sensor 208 and the biological information associated with the RPID included in the authentication request stored in the TPM 209. If the authentication is successful, in step S415, the biometric authentication unit 302 extracts, from the TPM 209, the secret key associated with the biological information ID of the biological information used for authentication. Further, the biometric authentication unit 302 encrypts "assertionChallenge" and "transaction" included in the authentication request, and creates signature data. Only the "assertionChallenge" may be encrypted. The biometric authentication unit 302 generates, as a response, "assertion" including the authentication information ID corresponding to the biological information ID of the biological information used for authentication and the created signature data. In step S416, the communication control unit 305 of the mobile terminal 101 transmits a response including the generated "assertion" to the management target device 104.

In step S417, the verification unit 333 of the management target device 104 executes verification processing using the "assertion" included in the response and the public key. This verification processing is the same as the assertion verification processing performed by the verification unit 322 of the authentication management system 103 described above. If the verification is successful, it is determined that the biometric authentication for the user corresponding to the user ID with which the management target device 104 is reserved is successful. In step S418, the operation request processing unit 331 sends a notification to the in-vehicle unit control unit 341 of the body ECU 245 to perform unlock processing. As a result, the door of the management target device 104 is unlocked. In step S419, the communication control unit 335 notifies the operation result (indicating that unlock processing is successful). In step S420, the display unit 304 of the mobile terminal 101 notifies the user of the operation result through the display 211.

Figure 6A:
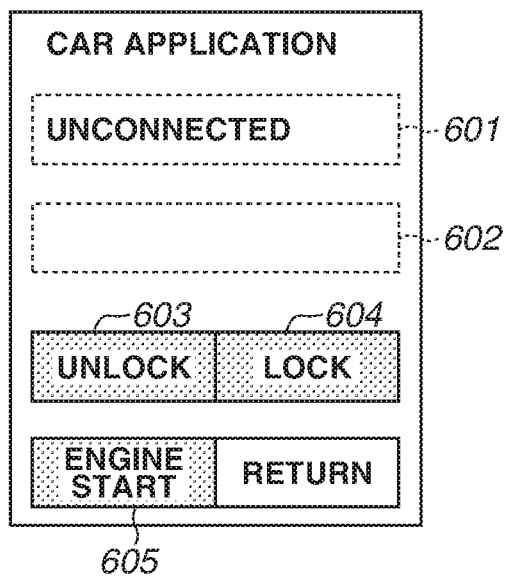
FIGS. 6A, 6B, 6C, and 6D are examples of an operation screen (UI) displayed on a mobile terminal according to the first exemplary embodiment.
Figure 6B:
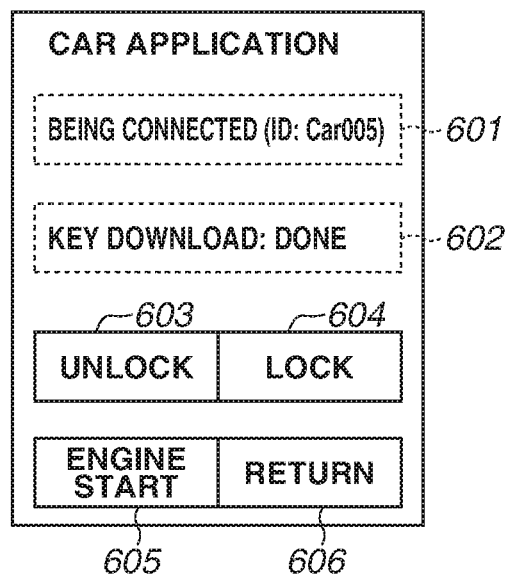
Figure 6C:
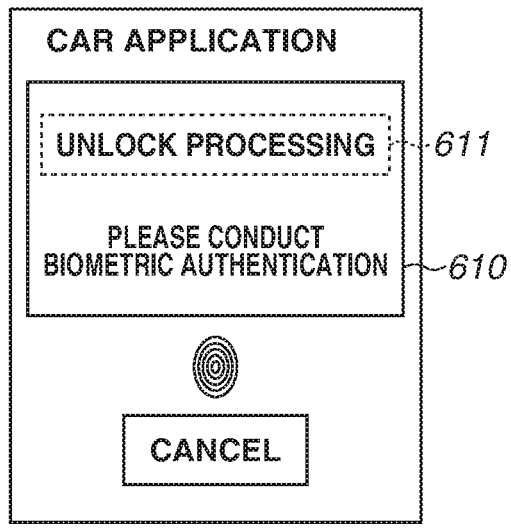

FIGS. 6A, 6B, 6C, and 6D each illustrates an example of the UI provided by the vehicle operation application of the mobile terminal 101. FIG. 6A illustrates the UI in a state where the near field communication between the mobile terminal 101 and the management target device 104 is not established. FIG. 6B illustrates the UI in a state where the near field communication between the mobile terminal 101 and the management target device 104 is established.

A connection status display unit 601 displays the connection state between the mobile terminal 101 and the management target device 104. A public key acquisition status display unit 602 displays information indicating whether the management target device 104 owns a public key for the connected user. Buttons 603 to 606 are buttons for transmitting operation instructions to the management target device 104 or the management server 102.

Referring to FIG. 6A, the buttons 603, 604, and 605 are buttons each for transmitting an instruction to the management target device 104. Accordingly, the buttons 603, 604, and 605 are displayed in such a manner that the buttons are invalid when the near field communication with the management target device 104 is not established. On the other hand, as illustrated in FIG. 6B, the display of the buttons 603, 604, and 605 is switched to a valid state when the near field communication with the management target device 104 is established. When the button 603 is pressed, the processing sequence illustrated in FIG. 4 is started. Further, when the button 606 is pressed, a processing sequence illustrated in FIG. 5 to be described below is started.

Referring to FIG. 6B, when the near field communication with the management target device 104 is established, information indicating whether the registration information holding unit 332 owns a copy of the public key for the user who has made a reservation can also be displayed on the public key acquisition status display unit 602. This enables the user to recognize a state where the management target device 104 cannot be operated when the management target device 104 is not connected to the network 105, and to take countermeasures such as execution of unlock processing once.

It is assumed that the vehicle serving as the management target device 104 is parked in a predetermined parking lot where the vehicle can communicate with an external system via a network and the vehicle is to be returned. Thus, when the user who has made a reservation goes to the predetermined packing lot to take the vehicle and uses the vehicle for the first time, it is highly likely that the vehicle can communicate with the external system (authentication management system) and can store reservation information and information for verification, in the memory 242 of the management target device 104. After that, when the vehicle has moved to a destination, the vehicle cannot communicate with the external system (authentication management system) in some cases. In this case, since the valid public key and the like are already registered in the management target device 104 by this sequence, the biometric authentication in the mobile terminal of the user who has made a reservation can be verified. Thus, as for an operation such as a re-unlock operation to be performed after locking at a destination, the biometric authentication through the mobile terminal of the user who has made a reservation is verified in the vehicle, so that a secure operation, such as protection against theft, can be appropriately carried out.

The same holds true when the management target device 104 is a drone or a robot. In a home delivery service or the like, it is highly likely that the management target device 104 can communicate with the external system (authentication management system) at a package loading spot. At this timing, user information and information for verification (e.g., public key) are stored in the drone or robot. In this case, even in a case where the drone cannot communicate with the external system (authentication management system) when the drone arrives at a delivery destination, the biometric authentication for the mobile terminal of the user can be verified in the drone or robot, thereby enabling safe delivery.

Figure 5:
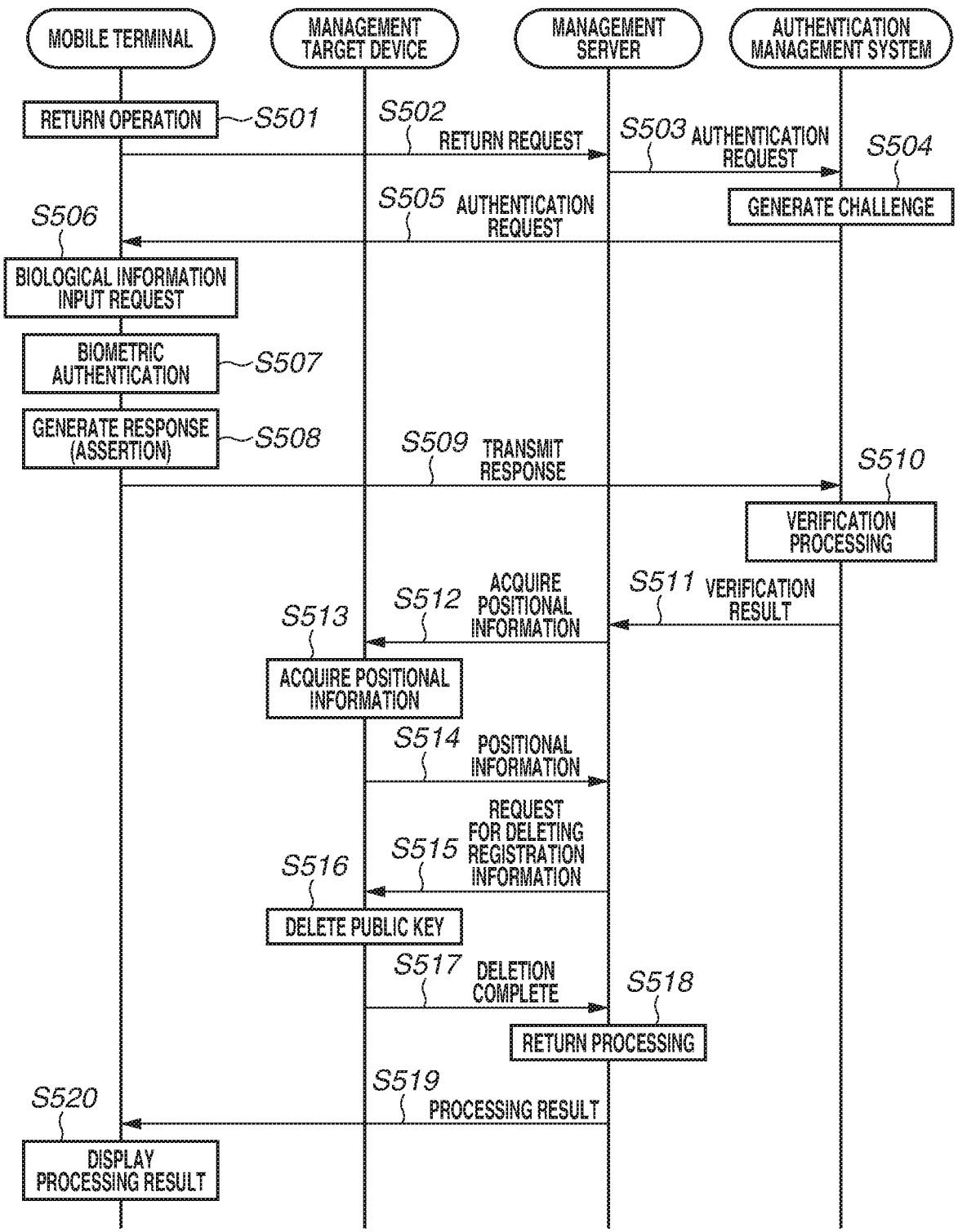
FIG. 5 is a sequence diagram illustrating vehicle return processing according to the first exemplary embodiment.

Next, processing for returning the management target device 104 (vehicle) will be described with reference to the processing sequence illustrated in FIG. 5. As described above, the vehicle operation application is installed in the mobile terminal 101 and the user inputs an operation through the operation screen provided by the application.

In step S501, the mobile terminal 101 detects a vehicle return operation performed by the user through the operation screen. In step S502, the operation request unit 303 transmits a request for returning the management target device 104 to the management server 102.

In step S503, the device return unit 313 of the management server 102 transmits an authentication request to the authentication management system 103.

In step S504, the verification unit 322 of the authentication management system 103 generates "assertionChallenge" and "transaction". In step S505, the verification unit 322 transmits the authentication request including "assertionChallenge" and "transaction" to the mobile terminal 101. The authentication request also includes RPID. Processing (steps S506 to S509) to be performed by the mobile terminal 101 which has received the authentication request is similar to the processing of steps S413 to S416 illustrated in FIG. 4, and thus the description thereof is omitted. FIG. 6A illustrates an example of a screen for prompting the user to present biological information to be displayed in step S506. A message display unit 610 displays information indicating that input of a character string (611), which is obtained by decoding the transaction based on Base64, and biological information is requested.

The processing in which the verification unit 322 of the authentication management system 103 verifies signature data included in the assertion in step S510 is also similar to the processing (e.g., step S417) described above, and thus the description thereof is omitted. In step S511, the verification unit 322 notifies the management server 102 of the verification result. When the notified result indicates that the verification is successful, in step S512, the position acquisition unit 334 starts communication with the management target device 104 corresponding to the device ID (vehicle ID) designated by a return request. Further, a request for acquiring positional information is transmitted to the management target device 104.

In step S513, the position acquisition unit 334 of the management target device 104 acquires, in response to a reception of the position acquisition request, the current position of the management target device 104 from the positional information module 249, and sends the positional information acquired in step S514 as a response. In this case, the current position of the management target device 104 is used to verify that the vehicle is present at a location where the vehicle is to be returned. The present exemplary embodiment assumes a case where a result is obtained using a positioning system such as a GPS and the value of the result is returned. For example, a beacon of Bluetooth Low Energy or the like may be installed at the location where the vehicle is to be returned and the vehicle may receive a signal from the beacon to determine whether the vehicle is near the location where the vehicle is to be returned.

In step S515, the device return unit 313 of the management server 102 transmits a request for deleting registration information, such as a public key, to the management target device 104. The deletion request includes the user ID and other information included in the return request.

In step S516, the registration information holding unit 332 deletes, from the memory 242, the registration information, such as the public key associated with the user ID, according to the deletion request. In step S517, the registration information holding unit 332 notifies the management server 102 of the result (indicating that the deletion processing is complete).

Figure 6D:
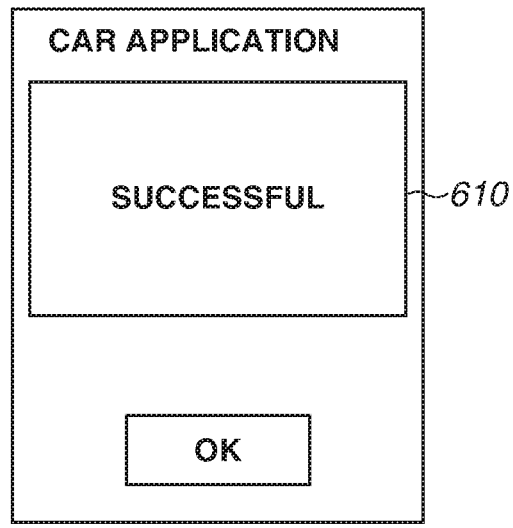

In step S518, the device return unit 313 of the management server 102 refers to the reservation information corresponding to the device ID (vehicle ID) and user ID designated by the return request, and changes the status indicated by the reservation status for the device ID (vehicle ID) to a returned state. In step S519, a notification indicating the processing result (indicating that the return processing is complete) is sent to the mobile terminal 101, and in step S520, the display unit 304 displays the processing result on the display 211. FIG. 6D illustrates a display screen for displaying the operation result on the display unit 304. Like in FIG. 6A, the message display unit 610 is provided to make it possible to notify the user of the result of the operation (return processing) performed by the user.

Figure 4:
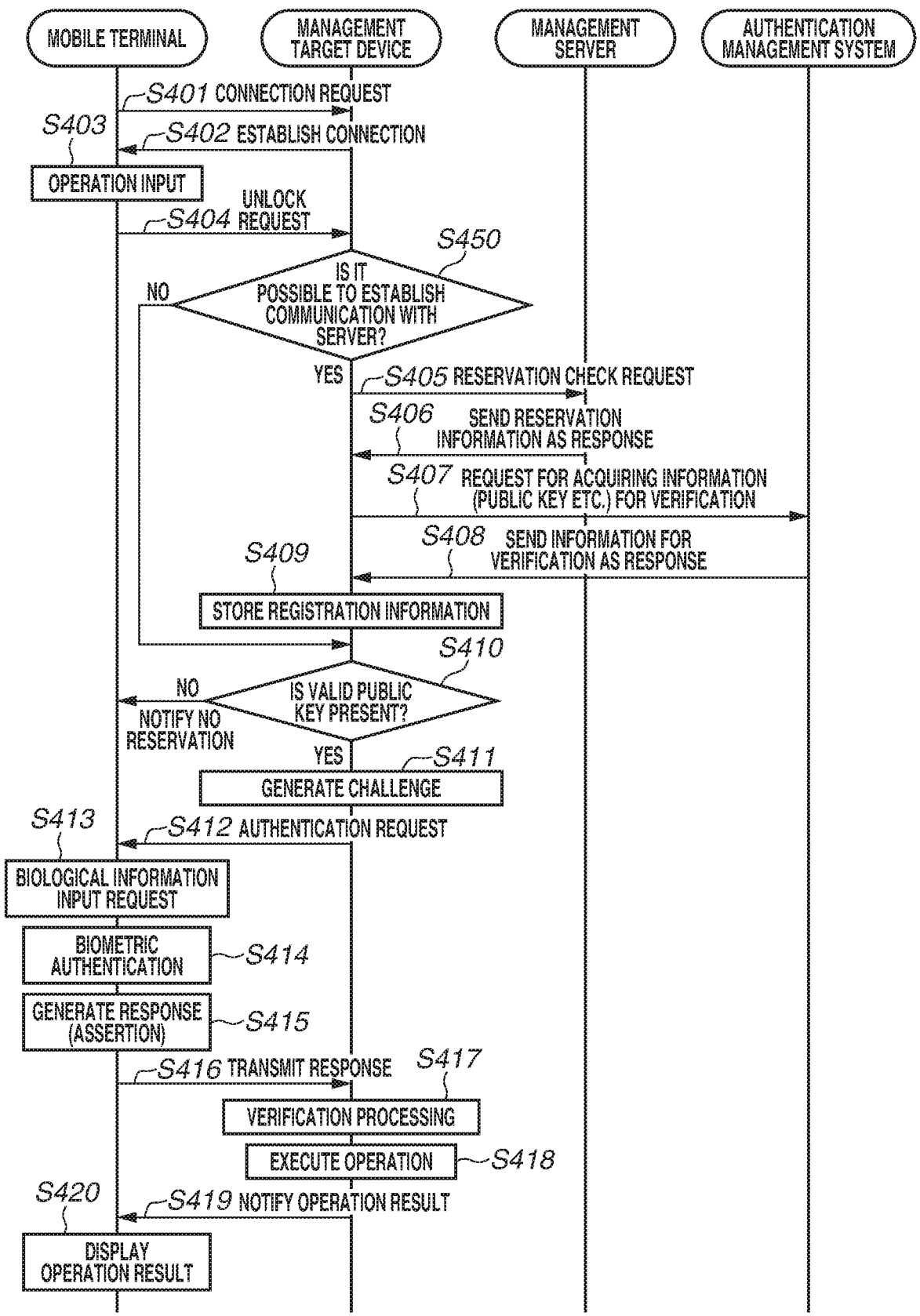
FIG. 4 is a sequence diagram illustrating vehicle operation processing according to the first exemplary embodiment.

In the present exemplary embodiment, a case is described where when the operation illustrated in FIG. 4 is started on the management target device 104 from the mobile terminal 101, registration (copying processing) of information for verification, such as a public key, in the management target device 104 is performed in steps S405 to S409. However, the timing for this copying processing is not limited to this timing. The execution of the processing at the following timing ensures registration of information for verification in the management target device 104.

For example, when the vehicle reservation processing is performed on the management server 102 from the mobile terminal 101, the device reservation unit 312 may request the management target device 104, for which the reservation is successful, to execute processing to be carried out in steps S405 to S409. In response to this request, the operation request processing unit 331 executes the copying processing.

In addition, the management target device 104 may acquire reservation information by periodically sending a check request to the management server 102 to check reservation information within a few days, without receiving a request from the mobile terminal 101 or the management server 102. If the reservation information can be acquired, the processing of steps S407 to S409 is executed to implement copying processing. In this way, when the management server 102 updates the reservation information (cancellation or reservation start date and time and cancellation or reservation end date and time, and public key), an operation corresponding to the updated information can be rapidly performed.

In the first exemplary embodiment, an example is described where unlock processing is started from when a user operation is performed through the vehicle operation application of the mobile terminal. In a second exemplary embodiment, an example is described where unlock processing is started from when an operation on the vehicle is performed.

FIG. 7 is a flowchart illustrating processing for starting the use of the management target device 104 (reservation vehicle) according to the second exemplary embodiment. In the present exemplary embodiment, like in the flowchart illustrated in FIG. 4, unlock processing is described as an example. However, this procedure can also be applied, for example, in a case where one of the functions in the device 104, such as an engine start processing, is used.

In this processing, assume that reservation information and information for verification (e.g., public key) for the user who has made a reservation are stored in the memory 242 of the management target device 104 at any of the timings described in the first exemplary embodiment. Further, to the management target device 104, one or more mobile terminals may be connected through near field communication. It is based on the premise that the mobile terminal of the user present in the vicinity of a device that performs an operation on the management target device 104 activates at least a (near field) wireless communication function.

In step S701, the operation detection unit 342 detects an operation on the management target device 104 by the user through the touch sensor 254. Specific examples of the operation include an operation on a door knob of the vehicle, and an operation for gripping the steering wheel of the vehicle. Based on these detected operations, it is determined whether to perform door unlock processing or engine start processing in the following processing.

In step S702, the registration information holding unit 332 checks whether information necessary for verification, such as a valid public key, is copied from the authentication management system 103, and the information is stored in the memory within the management target device 104. If a valid public key is present (YES in step S702), the processing proceeds to step S704. If a valid public key is not present (NO in step S702), the processing proceeds to step S703. In step S703, a notification indicating "no reservation" is sent to the mobile terminal (including at least the mobile terminal of the user who has operated the management target device 104) which is connected through near field communication.

In step S704, the verification unit 333 generates "assertionChallenge" and "transaction", like in step S411. Further, in step S705, the communication control unit 335 transmits, as an authentication request, the generated data to the mobile terminal (including at least the mobile terminal of the user who has operated the management target device 104) which is connected through near field communication.

The mobile terminal which has received the authentication request executes the processing including biometric authentication as described above in steps S413 to S416.

In step S706, the verification unit 333 receives a response including the assertion from the mobile terminal. In step S707, the verification unit 333 executes verification processing on the signature data included in the assertion. This processing is similar to the processing performed in step S417 described above, in the verification processing, it may be determined whether the verification for each public key is successful, by sequentially using all public keys which are stored in the memory within the management target device 104 and whose expiration date has not expired. This is because only the public key corresponding to the user ID of the user who has made a reservation, or the user ID of the passenger is registered in the management target device 104.

If the verification processing is successful, i.e., if the verification for biometric authentication in the mobile terminal of the user who has made a reservation is successful, in step S708, the operation request processing unit 331 sends a notification to the in-vehicle unit control unit 341 of the body ECU 245 to perform the unlock processing.

In step S709, the communication control unit 335 transmits the operation execution result (indicating that the unlock processing is successful) to the mobile terminal (including the mobile terminal of the user who has operated the management target 104) which is connected through near field communication.

MODIFIED EXAMPLE 1

The present embodiment can also be applied to a home delivery service provided by a flight device, such as a drone, as the management target device 104 as described above. More specifically, assume a case where home delivery products are delivered to one or more customers by using a mobile home delivery box that is implemented by a drone. Also, in this case, the authentication system according to the present invention can be applied to the delivery of home delivery products.

Assume that a user who has applied for a home delivery service using a drone registers information for verification (e.g., public key) in the service provision system including the authentication management system 103. In the case of registration, like in the first exemplary embodiment, credential registration processing based on the premise that biometric authentication is performed by the mobile terminal of the user that is used to receive home delivery products is executed.

Figure 8:
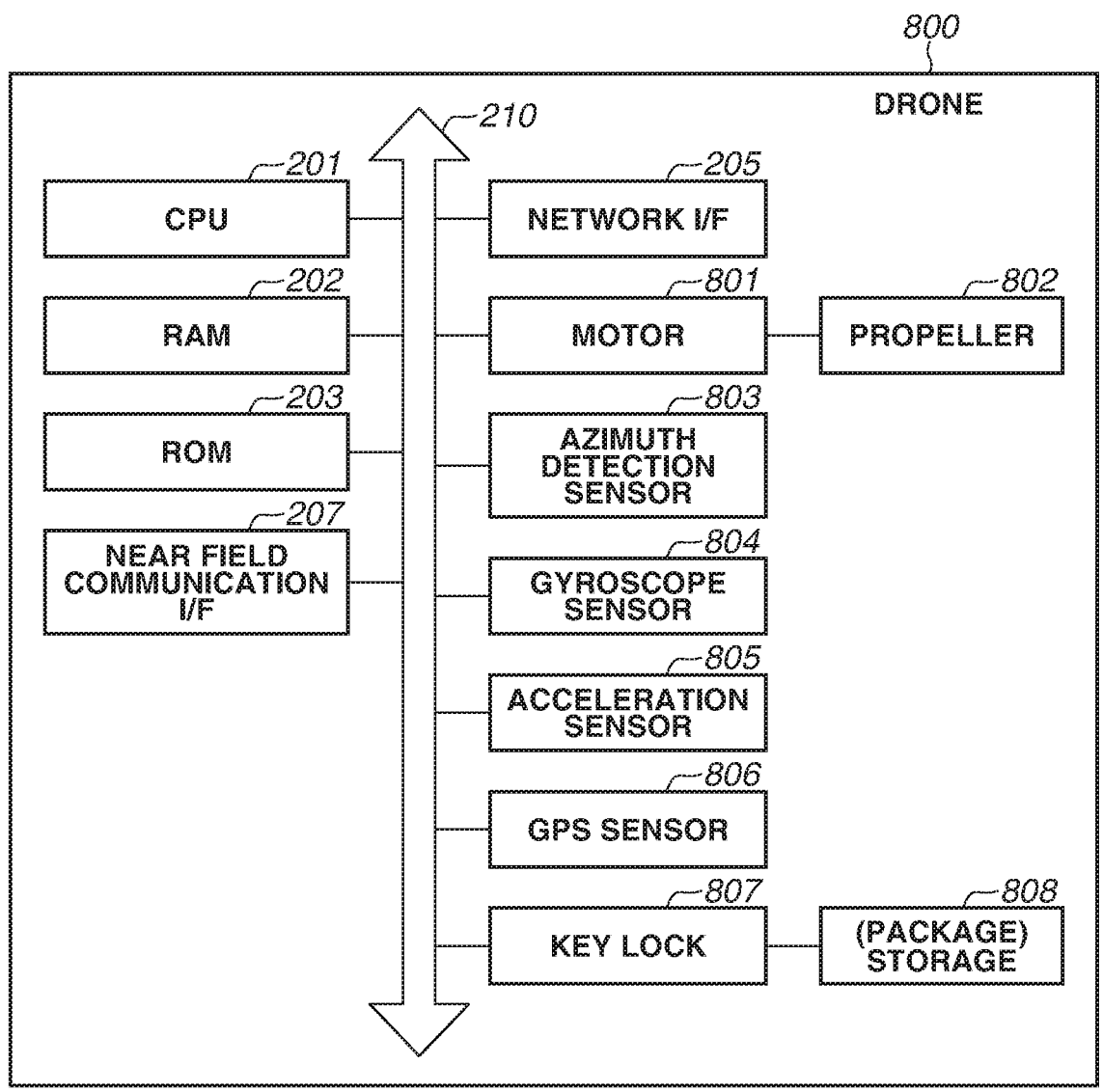
FIG. 8 is a block diagram illustrating an example of a hardware configuration of a drone as a device to which the present exemplary embodiments are applicable.

FIG. 8 illustrates an example of a hardware configuration of a drone. A drone 800 has a hardware configuration similar to the configuration of the mobile terminal 101. Components of the drone 800 that have functions similar to those of the mobile terminal 101 are denoted by the same reference numerals, and thus the descriptions thereof are omitted.

A motor 801 is controlled by the CPU 201 to control the rotational speed of a propeller 802 which is connected to the motor 801. Increasing the rotational speed of the propeller 802 enables the drone to take off and travel, while decreasing the rotational speed of the propeller 802 enables the drone to perform a landing operation. An azimuth detection sensor 803 is used to detect the azimuth of the flying drone 800. A gyroscope sensor 804 is used to detect the inclination of the drone 800. An acceleration sensor 805 is used to detect the acceleration of the drone 800. A GPS sensor 806 is used to detect the current position of the drone 800. The use of these sensors enables the drone 800 to recognize the position and the current state of the drone 800 and to fly independently. The drone 800 further includes a storage 808 for storing a package, and a key lock 807, which is a key for the storage 808. Personal identification is performed by biometric authentication when the key lock is released, which prevents people other than the person who has requested the home delivery from receiving the package. Accordingly, a personal identification method that is more advantageous than a method in which a person who has currently delivered home delivery products confirms the person who receives the home delivery products, can be provided even in a case of the drone delivery service.

A sequence for home delivery using the drone is similar to that illustrated in FIG. 4. In the sequence illustrated in FIG. 4, the public key is copied to the vehicle at the timing of an initial unlock operation. However, the timing when the public key is provided is not limited to the timing of the initial unlock operation, as described above. In a case of home delivery using the drone, the public key may be copied at the timing when a package delivery destination is input to the drone. Provision of a valid public key to the drone before home delivery enables verification of the secret key owned by the user even in a state where the drone cannot be connected to the Internet when home delivery products are sent to the user. This results in preventing the occurrence of a situation where the home delivery result of the drone is not dependent on the network state and the drone brings the package back without delivering it to the user when the authentication cannot be made.

In the case of a vehicle, in step S418, vehicle door unlock processing and the like are carried out. In the case of a drone, in step S418, the key lock 807 of the drone 800 is controlled to be unlocked.

Further, assuming a case where home delivery produces are delivered by the drone to each customer, information for verification, such as a public key, may be deleted, for example, after unlock processing is performed through communication with the mobile terminal of the user, or after home delivery products are taken out. Further, in the case of copying the public key before home delivery, a new public key may be copied after the information for verification previously stored is deleted.

MODIFIED EXAMPLE 2

The management target device 104 according to the present embodiment can be applied to a robot which is installed in a public facility, an office, or other places, and provides a plurality of users, such as customers, with a guidance service and other services.

A guide robot may be required to perform biometric authentication for specific users safely and provide services even when the network connection state varies due to a movement, accident, or other conditions.

Further, as the management target device 104, the present embodiment can also be applied to a device including a door having an electronic lock mechanism for an entrance of a user's home or a share house such as a guest house, or a safe. Even when a communication between a home network and the service provision system cannot be established, the device having the electronic lock mechanism copies information, such as a public key, which is required for verification, from the service provision system in advance, thereby enabling unlock processing after verifying the biometric authentication of the user for the device which is owned by the normal user. In the case of a guest house or the like, like in the case of car sharing described in the first exemplary embodiment, the length of stay for which a customer has made a reservation is used as an expiration date.

MODIFIED EXAMPLE 3

Further, as the management target device 104, the present embodiment can also be applied to an image processing apparatus, such as a printer or a multifunction peripheral, which includes a door having an electronic lock mechanism provided at a portion where an output material is ejected. Also, in the case of performing processing, such as special printing, by the image processing apparatus, the image processing apparatus may cause the mobile terminal according to the present invention to perform biometric authentication before executing the operation. In this case, information necessary for verification, such as a public key managed by the authentication management system 103, is copied and registered in a storage unit in the image processing apparatus.

MODIFIED EXAMPLE 4

In the present embodiment, a case where a function in which security is considered is added is assumed. More specifically, when a service is provided according to the biometric authentication for unlock processing or the like, the management target device 104 (e.g., vehicle, drone, robot) according to the present invention records, on a recording device in the device, various information such as information about the date and time and environments, the ID of the authenticated user, and the operation history, as a history. When the device can be connected to a network, these pieces of history information are transmitted to the management server 102.

Further, in the history, data on images captured by a camera (not illustrated) installed in the management target device 104 and information detected by a sensor (not illustrated) may desirably be recorded. With this configuration, even in a case where the mobile device provides services at a remote location, this situation can be traced later, thereby enhancing the convenience and security provided by the present invention.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-201417, filed Oct. 17, 2017, which is hereby incorporated by reference herein in its entirety.

What is claimed is:

1. A system comprising:
a mobile terminal including a storage area having a tamper resistance and configured to store user biological information required for performing authentication processing, and a biological information sensor configured to read the user biological information;
a service provision system configured to provide a user with a service for using a device; and
a device managed by the service provision system,
wherein the mobile terminal comprises a first memory storing instructions and a first processor executing the instructions stored in the first memory causing the mobile terminal to:
generate a pair of a secret key and a public key corresponding to the user biological information read by the biological information sensor;
store, in the storage area in an associated manner, the user biological information read by the biological information sensor, identification information for identifying authentication using the biological information, and the generated secret key; and
transmit the identification information and the public key paired with the generated secret key to the service provision system so that the identification information and the public key are registered in the service provision system,
wherein the service provision system comprises a second memory storing instructions and a second processor executing the instructions stored in the second memory causing the service provision system to:
manage, in an associated manner, the identification information received from the mobile terminal, the public key, user information about a user of the mobile terminal, and device information about a device to be used by the user; and perform transmission of a verification key being a copy of the public key managed in association with the device information, to the device indicated by the managed device information, wherein the device comprises a third memory storing instructions and a third processor executing the instructions stored in the third memory causing the device to:

store the verification key received from the service provision system;

generate a parameter for verification in a case where an operation request for the device is received after the verification key has been stored; and transmit an authentication request including the generated parameter to the connected mobile terminal in a case where the mobile terminal is connected to the device, wherein the instructions stored in the first memory further cause the mobile terminal to:

execute, in a case where the authentication request is received, biometric authentication using the user biological information read by the biological information sensor and the biological information stored in the storage area;

generate, in a case where the biometric authentication is successful, signature data using the secret key stored in the storage area in association with the biological information used for the biometric authentication, and the parameter included in the received authentication request; and transmit a response including the generated signature data to the device, and wherein the instructions stored in the third memory further cause the device to:

receive, from the mobile terminal, a response including signature data generated using the parameter included in the authentication request and the secret key stored in the mobile terminal in a case where biometric authentication is successful using the biological information execute verification of the signature data included in the response by using the stored verification key and the generated parameter; and execute the operation request for the device in a case where the verification is successful.

2. The system according to claim 1, wherein the transmission of the verification key in the service provision system is executed in response to an acquisition request from the device.

3. The system according to claim 2,
wherein the instructions stored in the third memory further cause the device to transmit the acquisition request to the service provision system in a case where the operation request for the device is generated, and
wherein the verification key acquired from the service provision system based on the acquisition request is stored.

4. The system according to claim 1, wherein the instructions stored in the third memory further cause the device to delete the stored verification key according to a deletion request from the service provision system.

5. The system according to claim 1, wherein the device includes any one of a vehicle, a drone, a robot, a device configured to control a door including an electronic lock mechanism, and an image processing apparatus.

6. A method for controlling a system that includes a mobile terminal having a storage area having a tamper resistance and configured to store user biological information required for performing authentication processing and a biological information sensor configured to read the user biological information, a service provision system configured to provide a user with a service for using a device, and a device managed by the service provision system, the method comprising:

generating, by the mobile terminal, a pair of a secret key and a public key corresponding to the user biological information read by the biological information sensor;

storing, in the storage area of the mobile terminal in an associated manner, the user biological information read by the biological information sensor, identification information for identifying authentication using the biological information, and the generated secret key;

transmitting, by the mobile terminal, the identification information and the public key paired with the generated secret key to the service provision system so that the identification information and the public key are registered in the service provision system;

managing, by the service provision system, in an associated manner, the identification information received from the mobile terminal, the public key, user information about a user of the mobile terminal, and device information about a device to be used by the user;

transmitting, by the service provision system, of a verification key being a copy of the public key, to the device indicated by the managed device information, the public key managed in association with the device information;

storing, by the device, the verification key received from the service provision system;

generating, by the device, a parameter for verification in a case where an operation request for the device is received after the verification key has been stored;

transmitting, by the device, an authentication request including the generated parameter to the mobile terminal in a case where the mobile terminal is connected to the device;

executing, by the mobile terminal, in a case where the authentication request is received, biometric authentication using the user biological information read by the biological information sensor and the biological information stored in the storage area;

generating, by the by the mobile terminal, in a case where the biometric authentication is successful, signature data using the secret key stored in the storage area in association with the biological information used for the biometric authentication, and the parameter included in the received authentication request;

transmitting, by the mobile terminal, a response including the generated signature data to the device;

receiving, by the device from the mobile terminal, a response including signature data generated using the parameter included in the authentication request and the secret key;

executing, by the device, verification of the signature data included in the response by using the stored verification key and the generated parameter; and executing, by the device, the operation request for the device in a case where the verification is successful.

7. A device managed by a service provision system configured to provide a user with a service for using a device, the device comprising:

a memory storing instructions and a processor executing the instructions causing the device to:

store a verification key received from the service provision system, wherein the verification key is a copy of a public key which has been registered in the service provision system by a mobile terminal of the user and is paired with a secret key having been stored in the mobile terminal in association with biological information of the user;

generate a parameter for verification in a case where an operation request for the device is received after the verification key has been stored;

transmit an authentication request including the generated parameter to the mobile terminal in a case where the mobile terminal is connected to the device;

receive, from the mobile terminal, a response including signature data generated using the parameter included in the authentication request and the secret key stored in the mobile terminal in a case where biometric authentication is successful using the biological information;

execute verification of the signature data included in the response by using the stored verification key and the generated parameter; and execute the operation request for the device in a case where the verification is successful.

8. The device according to claim 7, wherein the instructions further cause the device to transmit an acquisition request for acquiring the verification key to the service provision system.

9. The device according to claim 8, wherein the acquisition request is transmitted to the service provision system in a case where the operation request for the device is generated, and wherein the verification key acquired from the service provision system based on the acquisition request is stored.

10. The device according to claim 7, wherein the instructions further cause the device to delete the stored verification key according to a deletion request from the service provision system.

11. The device according to claim 7, wherein the device includes one or more of a vehicle, a drone, a robot, a device configured to control a door including an electronic lock mechanism, or an image processing apparatus.

12. The device according to claim 7, wherein the mobile terminal comprises:

a storage area having a tamper resistance and configured to store, in an association manner, the secret key and user biological information required for authentication processing; and a biological information sensor configured to read the user biological information, and wherein the public key generated to form a pair with the secret key is registered in the service provision system from the mobile terminal.

13. The device according to claim 7, wherein the operation request for the device is an unlock instruction transmitted from the mobile terminal.

14. A method for a device managed by a service provision system configured to provide a user with a service for using a device, the method comprising:

storing a verification key received from the service provision system, the verification key being a copy of a public key which has been registered in the service provision system by a mobile terminal of the user and is paired with a secret key having been stored in the mobile terminal in association with biological information of the user;

generating a parameter for verification in a case where an operation request for the device is received after the verification key has been stored;

transmitting an authentication request including the generated parameter to a connected mobile terminal in a case where the mobile terminal is connected to the device;

receiving, from the mobile terminal, a response including signature data generated using the parameter included in the authentication request and the secret key stored in the mobile terminal in a case where biometric authentication is successful;

executing verification of the signature data included in the response by using the stored verification key and the generated parameter; and executing the operation request for the device in a case where the verification is successful.

15. A non-transitory computer readable storage medium on which is stored a computer program for making a computer execute a method for a device managed by a service provision system configured to provide a user with a service for using a device, the method comprising:

storing a verification key received from the service provision system, the verification key being a copy of a public key which has been registered in the service provision system by a mobile terminal of the user and is paired with a secret key having been stored in the mobile terminal in association with biological information of the user;

generating a parameter for verification in a case where an operation request for the device is received after the verification key has been stored;

transmitting an authentication request including the generated parameter to a connected mobile terminal in a case where the mobile terminal is connected to the device;

receiving, from the mobile terminal, a response including signature data generated using the parameter included in the authentication request and the secret key stored in the mobile terminal in a case where biometric authentication is successful;

executing verification of the signature data included in the response by using the stored verification key and the generated parameter; and executing the operation request for the device in a case where the verification is successful.

* * * * *